(12) United States Patent
Kim et al.

(10) Patent No.: US 8,674,557 B2
(45) Date of Patent: Mar. 18, 2014

(54) RESONANCE POWER GENERATION APPARATUS

(75) Inventors: Nam Yun Kim, Seoul (KR); Eun Seok Park, Suwon-si (KR); Sang Wook Kwon, Seongnam-si (KR); Young Tack Hong, Seongnam-si (KR); Young Ho Ryu, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 512 days.

(21) Appl. No.: 13/079,883

(22) Filed: Apr. 5, 2011

(65) Prior Publication Data

US 2011/0248571 A1 Oct. 13, 2011

(30) Foreign Application Priority Data

Apr. 8, 2010 (KR) .................. 10-2010-0032141

(51) Int. Cl.
*H01H 9/54* (2006.01)

(52) U.S. Cl.
USPC .......................................... 307/140

(58) Field of Classification Search
USPC .......................................... 307/140
See application file for complete search history.

(56) References Cited

U.S. PATENT DOCUMENTS 6,263,247 B1 7/2001 Mueller et al.

FOREIGN PATENT DOCUMENTS

| JP | 09-182304 | 7/1997 |
| JP | 2000-217280 | 8/2000 |
| KR | 10-2005-0054816 | 6/2005 |

*Primary Examiner* — Robert L. Deberadinis
(74) *Attorney, Agent, or Firm* — NSIP Law

(57) ABSTRACT

Provided are a resonance power generation apparatus and method for wireless power transmission. The resonance power generation apparatus may include a voltage controller to receive an input of an alternating current (AC) signal of a first frequency band and to output a direct current (DC) voltage having a constant level, a power converter to separate the DC voltage into a voltage waveform and a current waveform by a switching pulse signal of a second frequency band, and a resonance power generator to generate an AC resonance power from the voltage waveform and the current waveform.

11 Claims, 19 Drawing Sheets ent application No. 10-2010-0032141, filed on Apr. 8, 2010, in the Korean Intellectual Property Office, the entire disclosure of which is incorporated herein by reference for all purposes.

BACKGROUND

1. Field

The following description relates to a resonance power generation apparatus for wireless power transmission.

2. Description of Related Art

Wireless power transmission technology enables power to be wirelessly supplied to a device or a battery of a device using a resonator.

To efficiently transmit power in a wireless manner, for example, an alternating signal in a band of several hundreds of kilohertz (KHz) to several tens of megahertz (MHz) may be generated. A frequency band of several tens of hertz (Hz) may be used for alternating signals.

However, converting an alternating signal in a band of several tens of Hz into an alternating signal in a band of several hundreds of KHz to several tens of MHz may result in a significant loss of power.

SUMMARY

In one general aspect, there is provided a resonance power generation apparatus, including a voltage controller to receive an input of an alternating current (AC) signal of a first frequency band, and to output a direct current (DC) voltage that has a constant level, a power converter to separate the DC voltage into a voltage waveform and a current waveform by a switching pulse signal of a second frequency band, a resonance power generator to generate an AC resonance power by combining the voltage waveform and the current waveform, and to remove a harmonic component, and a controller to apply the switching pulse signal to the power converter.

The power converter may comprise a switching device that is switched based on the switching pulse signal, and a voltage accumulator to accumulate a voltage output via the switching device during a low level of the switching pulse signal.

The resonance power generator may comprise a frequency resonating unit to generate an AC signal with a resonance frequency, a matching transformer to generate an AC resonance power with a sine waveform from an AC signal output from the frequency resonating unit, and a source resonator to transmit a generated resonance power to a target resonator.

The switching pulse signal may comprise a sine wave signal or a square wave signal.

The controller may drive signal levels of the voltage waveform and the current waveform that are output from the power converter, by adjusting a power level of the switching pulse signal.

The controller may select a switching pulse signal from among the sine wave signal and the square wave signal, based on a transmission efficiency and a distance to a target resonator, and may provide the selected switching pulse signal to the power converter.

The second frequency band may range from 500 kilohertz (KHz) to 20 megahertz (MHz).

The controller may control a duty rate of the switching pulse signal to be 10% to 90%.

The voltage waveform and the current waveform may not overlap with each other.

The controller may control the voltage controller such that an output voltage of the switching device in the power converter is less than or equal to a set value.

The AC signal of the first frequency band may be generated by a high-speed switching scheme employing a high-speed switching device or by an oscillation scheme employing an oscillator.

Other features and aspects may be apparent from the following detailed description, the drawings, and the claims.

BRIEF DESCRIPTION OF THE DRAWINGS

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, description of well-known functions and constructions may be omitted for increased clarity and conciseness.

Figure 1:
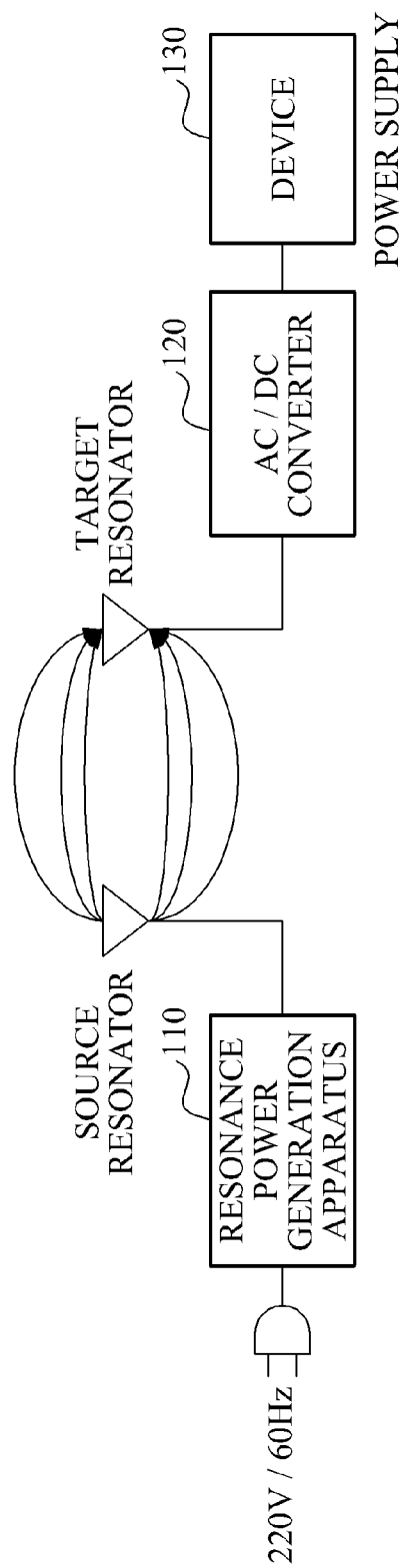
FIG. 1 is a diagram illustrating an example of a resonance power generation apparatus and a resonance power receiving apparatus.

FIG. 1 illustrates an example of a resonance power generation apparatus and a resonance power receiving apparatus.

Referring to FIG. 1, resonance power generation apparatus 110 may wirelessly transfer power to a device 130 using a resonance phenomenon. The resonance power generation apparatus 110 may include a source resonator. The source resonator and a target resonator may resonate at the same resonance frequency such that energy may be coupled. An alternating current (AC) signal transferred via the target resonator may be converted by an AC-to-DC (AC/DC) converter 120 into a direct current (DC) voltage to be used by the device 130.

For example, the resonance power generation apparatus 110 may receive an input of an AC power of 220 Volts (V) at a frequency of 60 hertz (Hz) from an external device, and may convert the AC power into an AC power in a band of, for example, several hundreds of kilohertz (KHz) to several tens of megahertz (MHz). In this example, in the converted AC power, a voltage waveform and a current waveform may be separated.

Figure 2:
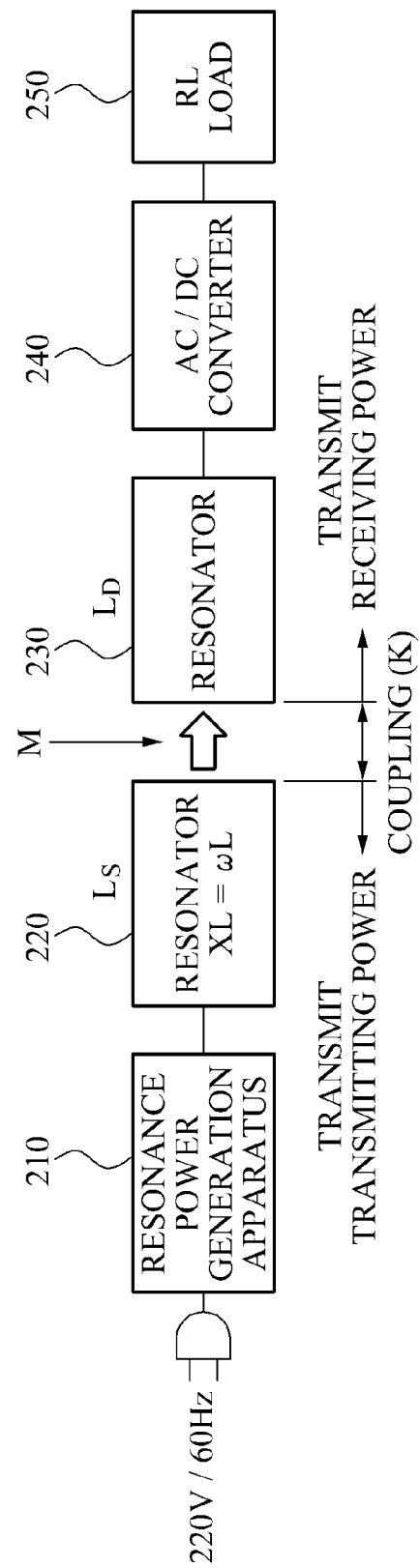
FIG. 2 is a diagram illustrating an example of a resonance power transfer mechanism.

FIG. 2 illustrates an example of a resonance power transfer mechanism.

Referring to FIG. 2, resonance power generation apparatus 210 may receive an input of an AC power, for example, an input of 220 V at a frequency of 60 Hz from an external device, and may convert the AC power into an AC power in a band from several hundreds of KHz to several tens of MHz. A voltage V and a current I of the AC power may satisfy "V=ωLI [volt]" and "I=V/ωL=V/$X_L$". The AC power may be transferred by an inductive reactance value $X_L$ of a resonator 220. In this example, the inductive reactance value $X_L$ of the resonator 220 may satisfy "$X_L$=ωL=2πfL[Ohm]".

Resonance power may be transmitted through energy coupling, based on a coupling coefficient K by the resonator 220 and a resonator 230. When an inductance of the resonator 220 is $L_S$, and an inductance of the resonator 230 is $L_D$, the coupling coefficient K may be defined as illustrated in Equation 1 below.

$$\kappa = \omega M / (2\sqrt{L_S L_D})$$ [Equation 1]

In Equation 1, ω denotes an angular frequency of an AC signal, and M denotes a mutual inductance between the resonators 220 and 230.

Power received through the resonator 230 may be converted into a DC voltage by the AC/DC converter 240, and the DC voltage may be provided to an RL Load 250.

Figure 3:
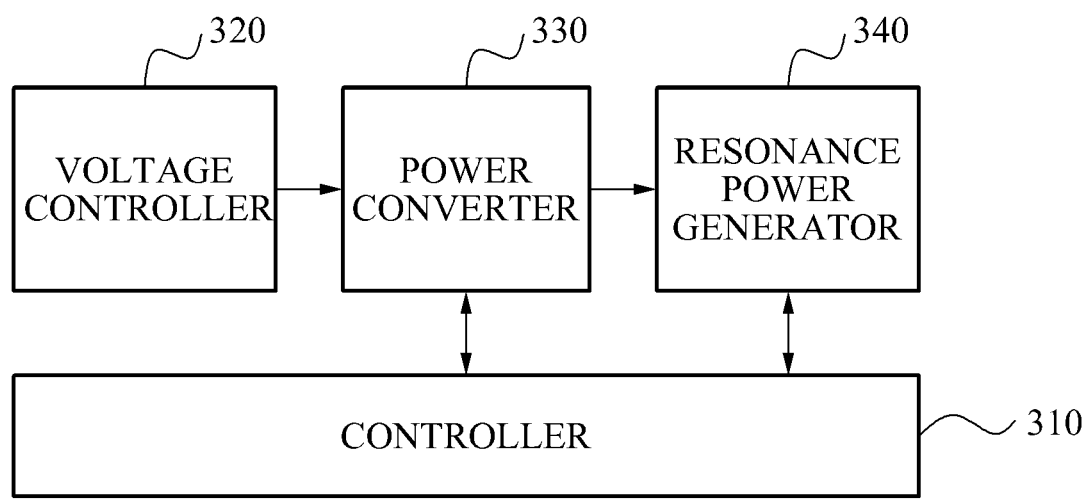
FIG. 3 is a diagram illustrating an example of a resonance power generation apparatus.

FIG. 3 illustrates an example of a resonance power generation apparatus.

Referring to FIG. 3, the resonance power generation apparatus includes a controller 310, a voltage controller 320, a power converter 330, and a resonance power generator 340.

Figure 4:
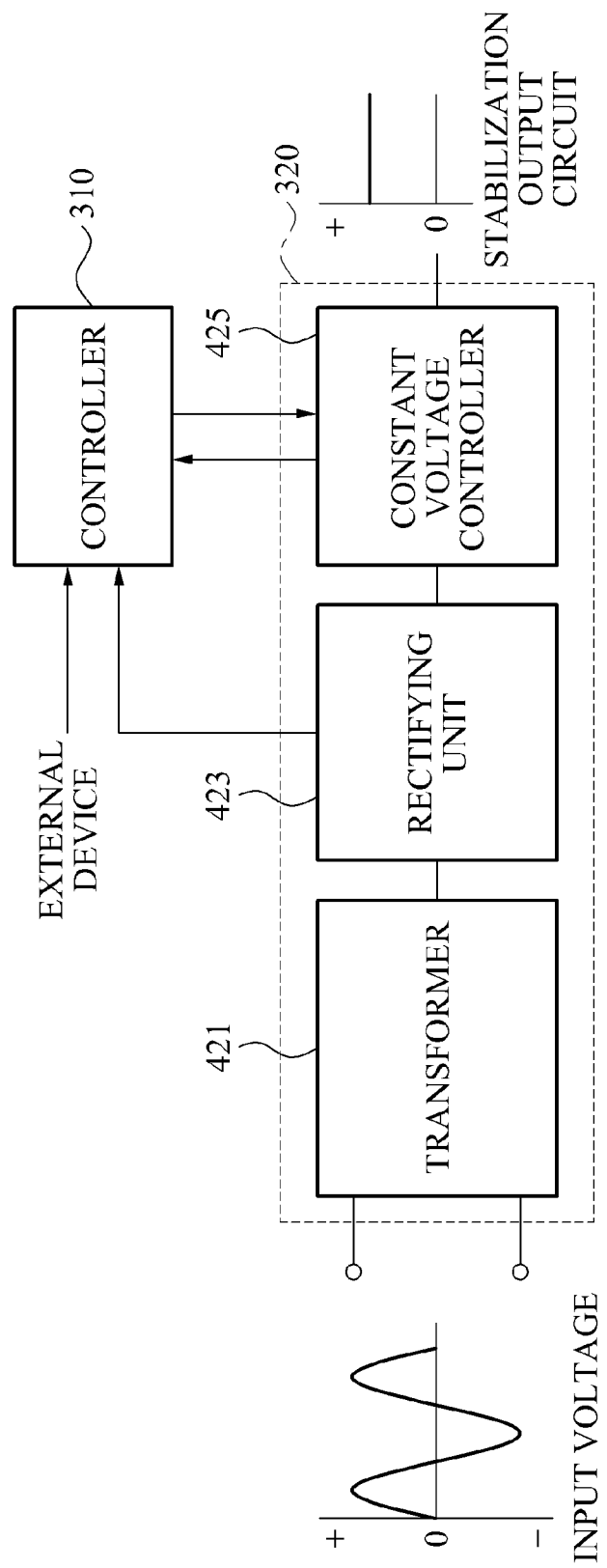
FIG. 4 is a diagram illustrating an example of a voltage controller of FIG. 3.

The voltage controller 320 may receive an input of an AC signal of a first frequency band, and may output a DC voltage that has a constant level. As an example, the first frequency band may be a band of several tens of Hz. An example of a configuration of the voltage controller 320 is illustrated in FIG. 4. In this example, the AC signal of the first frequency band may be generated by a high-speed switching scheme employing a high-speed switching device, or by an oscillation scheme employing an oscillator. As another example, the AC signal of the first frequency band may be generated in a phase locked loop (PLL, not illustrated). A magnitude of a power transmitted from the resonance power generation apparatus to a resonance power receiving apparatus may be adjusted based on a level of the DC voltage output from the voltage controller 320.

Figure 7:
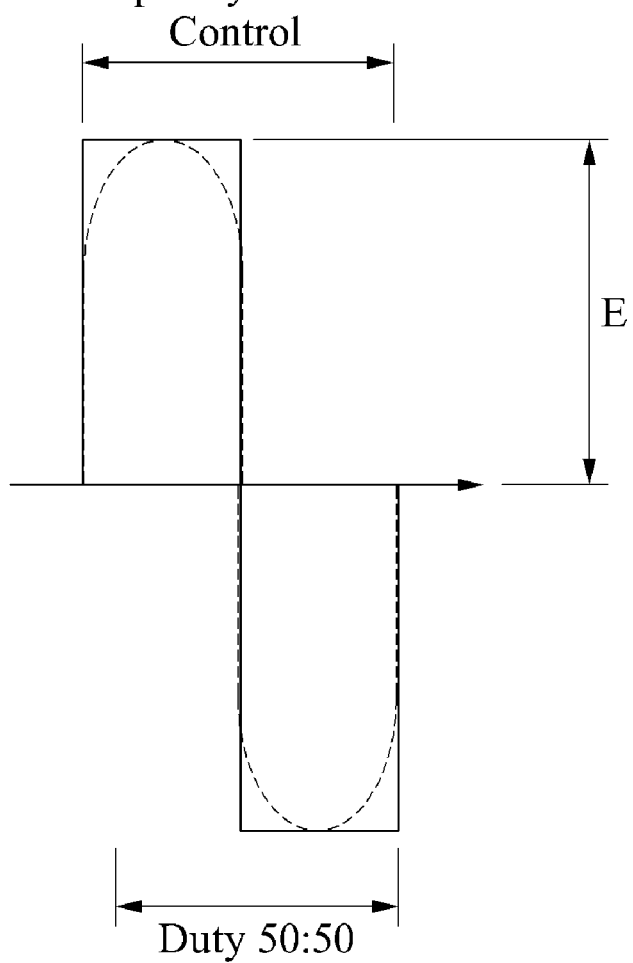
FIG. 7 is a diagram illustrating an example of a switching pulse signal.

The controller 310 may provide the power converter 330 with a switching pulse signal of a second frequency band. For example, the switching pulse signal may have a sine waveform or a square waveform, as illustrated in FIG. 7. Referring to FIG. 7, the controller 310 may control a duty rate of the switching pulse signal to be a ratio of 50:50, to control the switching pulse signal such that a voltage waveform and a current waveform separated by the power converter 330 do not overlap with each other. As an example, the second frequency band may be, for example, a band of several hundreds of KHz to several tens of MHz. The duty rate of the switching pulse signal may be set to a margin of ±10%, based on the 50:50 ratio. As an example, the controller 310 may control the duty rate of the switching pulse signal to be 10% to 90%.

Additionally, the controller 310 may drive signal levels of the voltage waveform and the current waveform output from the power converter 330, by adjusting a power level of the switching pulse signal. For example, the switching pulse signal may enable the power converter 330 to be switched and driven. Additionally, the voltage waveform and the current waveform may be obtained by the switching pulse signal, and thus a power loss in converting power may be reduced.

Figure 8:
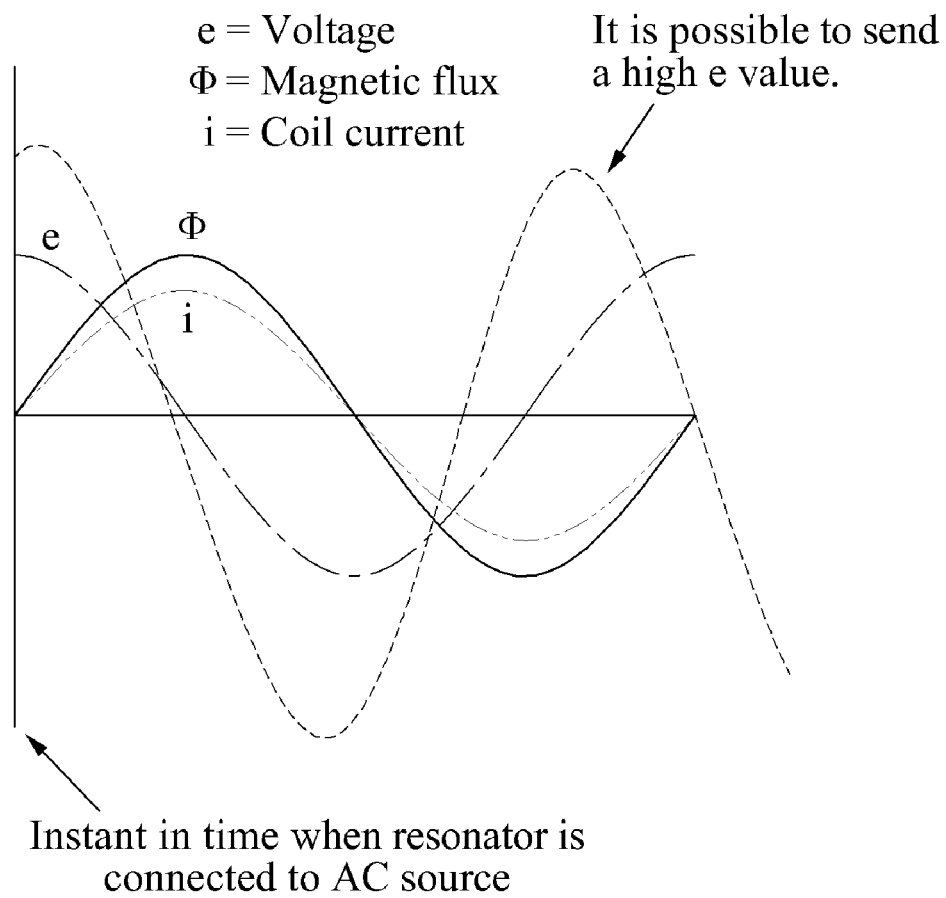
FIG. 8 is a diagram illustrating an example of magnetic flux generated based on a voltage waveform and a current waveform.

The power converter 330 may separate the DC voltage that has the constant level into the voltage waveform and the current waveform by the switching pulse signal of the second frequency band. When the DC voltage is separated into the voltage waveform and the current waveform as illustrated in FIG. 6, the voltage waveform and the current waveform may not overlap with each other. The power converter 330 is further described with reference to FIG. 5. When an AC resonance power is generated after the voltage waveform and the current waveform are separated as illustrated in FIG. 6, a loss in rectifying the AC signal may be reduced. When the voltage waveform and the current waveform are not separated, a magnetic flux may be formed based on the voltage waveform and the current waveform, as illustrated in FIG. 8.

The resonance power generator 340 may generate an AC resonance power from the voltage waveform and the current waveform.

FIG. 4 illustrates an example of the voltage controller 320 of FIG. 3.

Referring to FIG. 4, the voltage controller 320 includes a transformer 421, a rectifying unit 423, and a constant voltage controller 425.

The transformer 421 may adjust a signal level of an AC signal received from an external device to a desired level.

The rectifying unit 423 may output a DC signal by rectifying the AC signal output from the transformer 421.

The constant voltage controller 425 may output a DC voltage that has a constant level, under a control of the controller 310. For example, the constant voltage controller 425 may include a stabilization circuit for outputting a DC voltage that has a constant level. A voltage level of the DC voltage output from the constant voltage controller 425 may be determined by controlling an output of a power to be used by a resonance power receiving terminal and a resonance power.

In FIG. 4, the controller 310 may receive a supply of a voltage to be used for a control operation from the rectifying unit 423, or from the constant voltage controller 425, or from the external device.

Figure 5:
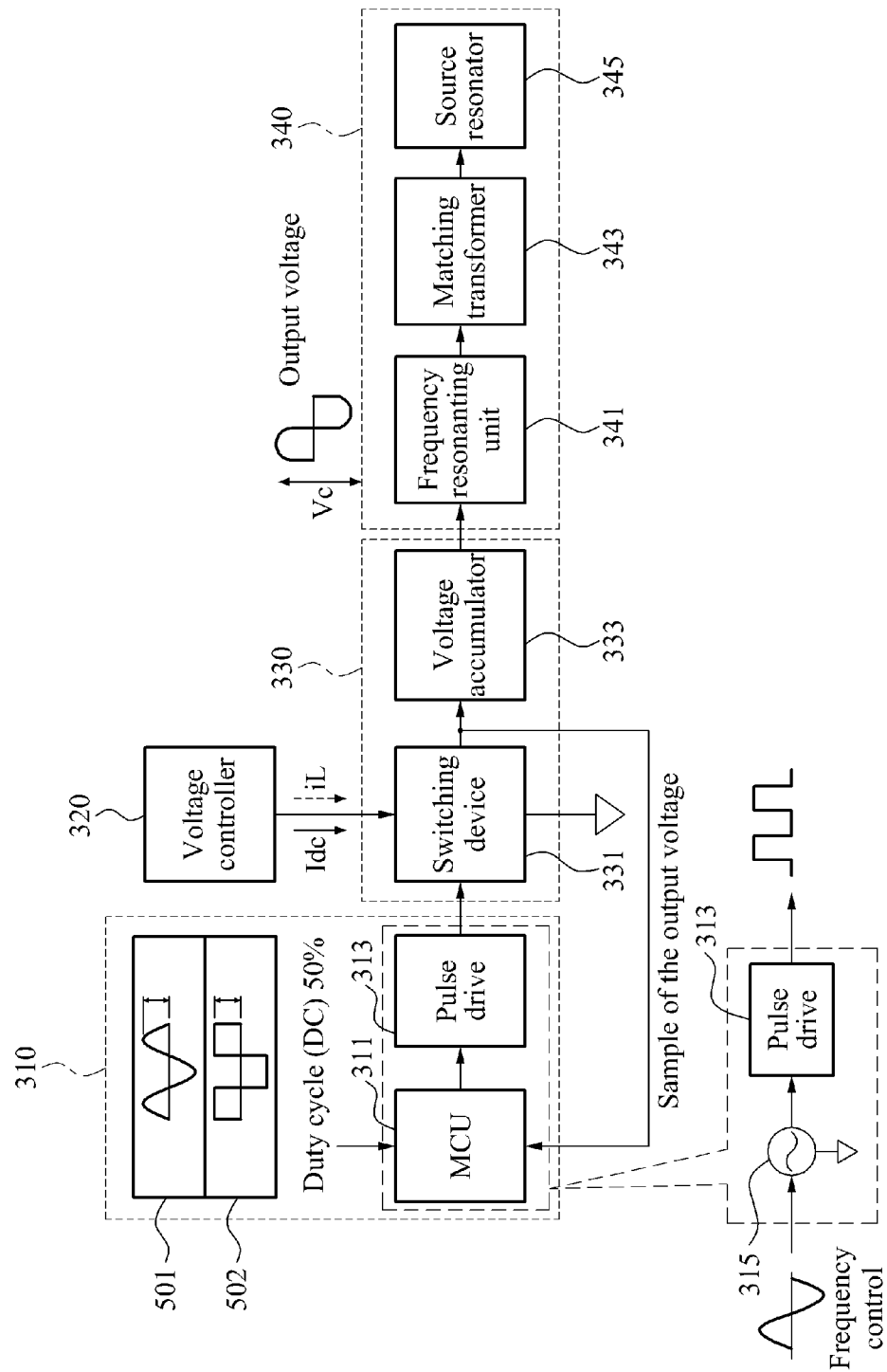
FIG. 5 is a diagram illustrating another example of the resonance power generation apparatus of FIG. 3.
Figure 6:
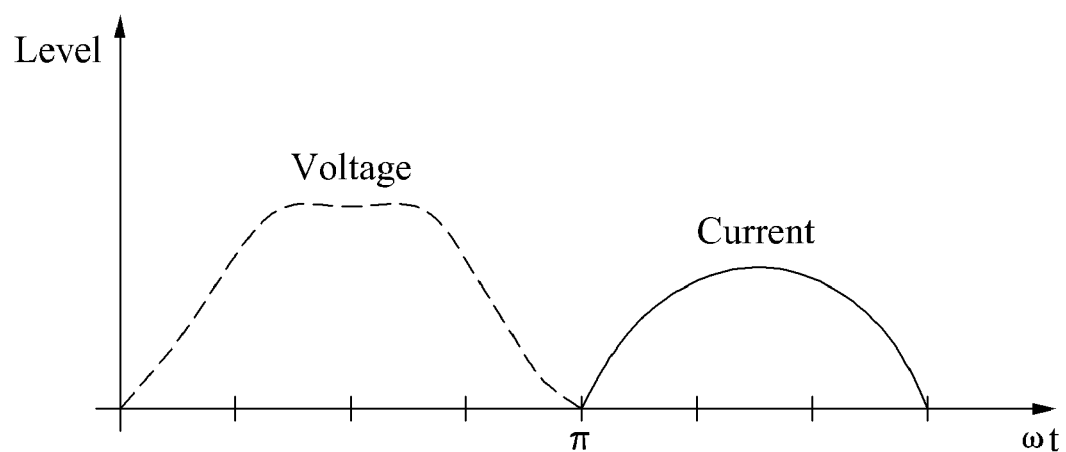
FIG. 6 is a diagram illustrating an example of an alternating current (AC) signal in which a voltage waveform and a current waveform are separated.

FIG. 5 illustrates another example of the resonance power generation apparatus of FIG. 3.

Referring to FIG. 5, the controller 310 may include a main control unit (MCU) 311 and a pulse drive 313. The power converter 330 may include a switching device 331, and a voltage accumulator 333. Additionally, the resonance power generator 340 may include a frequency resonating unit 341, a matching transformer 343, and a source resonator 345.

The MCU 311 may receive an input of, for example, a sine wave switching pulse signal 501 and a square wave switching pulse signal 502, and may store the received signals 501 and 502 in a memory. The MCU 311 may select a switching pulse signal from among the sine wave switching pulse signal 501 and the square wave switching pulse signal 502 based on a transmission efficiency and information on a distance to a target resonator. The MCU 311 may provide the selected switching pulse signal to the switching device 331 via the pulse drive 313. For example, the switching pulse signal may be generated in an oscillator (not illustrated) or a PLL (not illustrated). The switching pulse signal generated in the oscillator or the PLL may be input to the switching device 331. Additionally, the switching pulse signal generated in the oscillator or the PLL may be converted into the square wave switching pulse signal 502 through the pulse drive 313, and the converted switching pulse signal may be input to the switching device 331. For example, the square wave switching pulse signal 502 may be generated by periodically turning on or off an Input/Output (I/O) port of the MCU 311.

The pulse drive 313 may increase a signal level of a switching pulse signal to increase a level of power generated through the switching device 331 and the frequency resonating unit 341. For example, the pulse drive 313 may act as a device for power drive. Additionally, the signal level of the switching pulse signal may be further increased by adding an amplifier between the pulse drive 313 and the switching device 331.

For example, if the distance to the target resonator is less than a preset value, the MCU 311 may select the square wave switching pulse signal 502. If the distance to the target resonator is equal to or greater than the preset value, the MCU 311 may select the sine wave switching pulse signal 501. A duty rate of each of the sine wave switching pulse signal 501 and the square wave switching pulse signal 502 may be set to be a ratio of 50:50, as illustrated in FIG. 7.

The sine wave switching pulse signal 501 may have lower transmission efficiency than the square wave switching pulse signal 502, however, the sine wave switching pulse signal 501 may be suitable for long-distance transmission. In FIG. 7, a transmission efficiency of the square wave switching pulse signal 502 to a transmission efficiency of the sine wave switching pulse signal 501 may be established to be $E\sqrt{2}:E$.

For example, the MCU 311 may control the voltage controller 320 such that an output voltage of the switching device 331 in the power converter 330 does not exceed a set value. For example, when a sampling value of the output voltage of the switching device 331 is received, and the output voltage of the switching device 331 becomes excessively high, the MCU 311 may control the voltage controller 320 to lower a signal level of the DC voltage. The controller 310 may further include a communication module (not illustrated).

The communication module may receive power to be used by a target device, and information on a change in surroundings around the target device, through a communication with the target device, and may control the voltage controller 320. Additionally, the controller 310 may monitor an output voltage of the switching device 331, and an output waveform of the resonance power generator 340. The controller 310 may control the voltage controller 320 and the like, such that a stable frequency and AC power may be generated through the monitoring.

The switching device 331 may be configured with a high-speed field effect transistor (FET) that is switched by a switching pulse signal. If the switching pulse signals 501 and 502 are "high", the switching device 331 may be powered on. If the switching pulse signals 501 and 502 are "low", the switching device 331 may be powered off. Additionally, when the switching device 331 is powered on, a DC current Idc and a fundamental wave current −iL may flow into the switching device 331, and both ends of the switching device 331 may have a voltage of "0". If the switching device 331 is powered off, a DC voltage may be accumulated in the voltage accumulator 333.

The voltage accumulator 333 may accumulate a voltage output through the switching device 331 during a low level of the switching pulse signals 501 and 502. For example, when the switching device 331 is powered off, energy may be stored in the voltage accumulator 333, and the fundamental wave current −iL may flow into the resonance power generator 340 by the stored energy.

As described above, the resonance power generation apparatus may generate AC power using a DC power source provided by the voltage controller 320. Thus, it is possible to reduce a loss due to power conversion.

The frequency resonating unit 341 may combine a voltage waveform and a current waveform, and may isolate a harmonic component from a signal obtained by combining the voltage waveform and the current waveform such that the signal may pass through only a set frequency band. For example, the frequency resonating unit 341 may generate an AC signal with a resonance frequency by passing the signal through only a set frequency band.

The matching transformer 343 may generate AC resonance power with a sine waveform, by adjusting a voltage level or a current level of the AC signal output from the frequency resonating unit 341.

Additionally, the matching transformer 343 may perform adjusting such that an output voltage may be higher than an input voltage, and an output current may be higher than an input current. For example, the matching transformer 343 may include a primary winding and a secondary winding, and may adjust a winding ratio of the primary winding and the secondary winding such that the output voltage is greater than the input voltage.

Assuming that M primary windings and N secondary windings exist, if N is greater than M, the matching transformer 343 may perform adjusting such that an output voltage is higher than an input voltage. Additionally, when an AC I and/or a voltage V is applied, the matching transformer 343 may generate a magnetic field in a direction of an AC voltage and/or current. Accordingly, a magnetic flux may be generated by the magnetic field. When the magnetic flux changes, a voltage and/or a current of the matching transformer may increase.

The source resonator 345 may transmit resonance power to a target resonator (not illustrated) through energy coupling. The energy coupling may include, for example, magnetic coupling.

The switching pulse signals 501 and 502 may be generated by a high-speed switching scheme or an oscillation scheme.

For example, the high-speed switching scheme may be implemented using a high-speed switching device such as a FET. The oscillation scheme may be implemented by an oscillator 315. As illustrated in FIG. 5, the controller 310 may include the oscillator 315. An oscillation frequency of the oscillator 315 may be controlled by the MCU 311, and the oscillator 315 may output an AC signal that has a predetermined oscillation frequency. The pulse drive 313 may act as a device for power drive.

Figure 9:
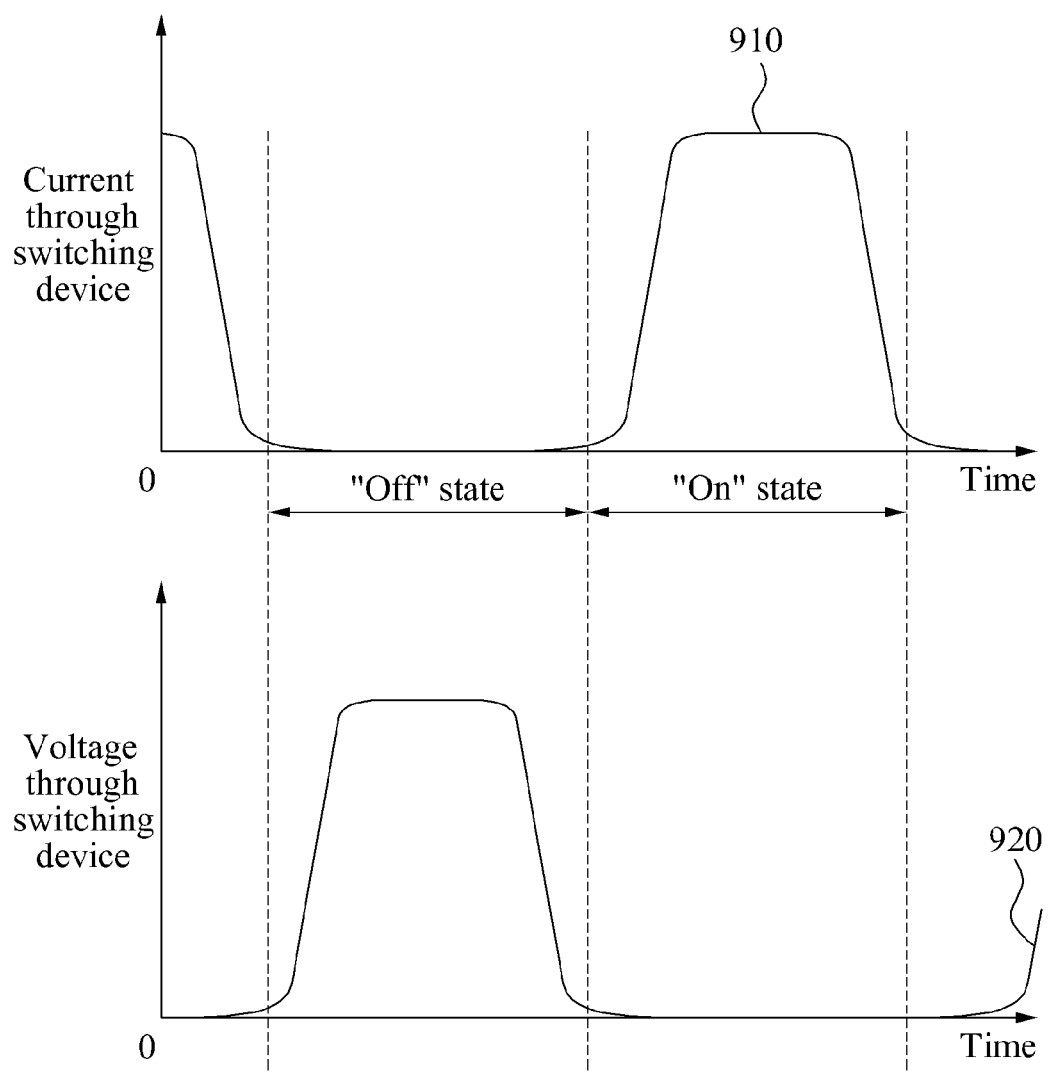
FIG. 9 is a diagram illustrating examples of waveforms of a signal that are output from a switching device of a resonance power generation apparatus.

FIG. 9 illustrates examples of waveforms of a signal that are output from a switching device of a resonance power generation apparatus.

Referring to FIG. 9, a current waveform 910 and a voltage waveform 920 of a signal output from the switching device 331 may be controlled to be within an error margin of −10% to +10%, based on a duty rate of 50%. For example, the controller 310 may control a switching pulse signal such that a waveform of a signal output from the switching device 331 is maintained at a duty rate of 50%.

As illustrated in FIG. 9, the current waveform 910 and the voltage waveform 920 may be separated by a switching pulse signal.

Figure 10:
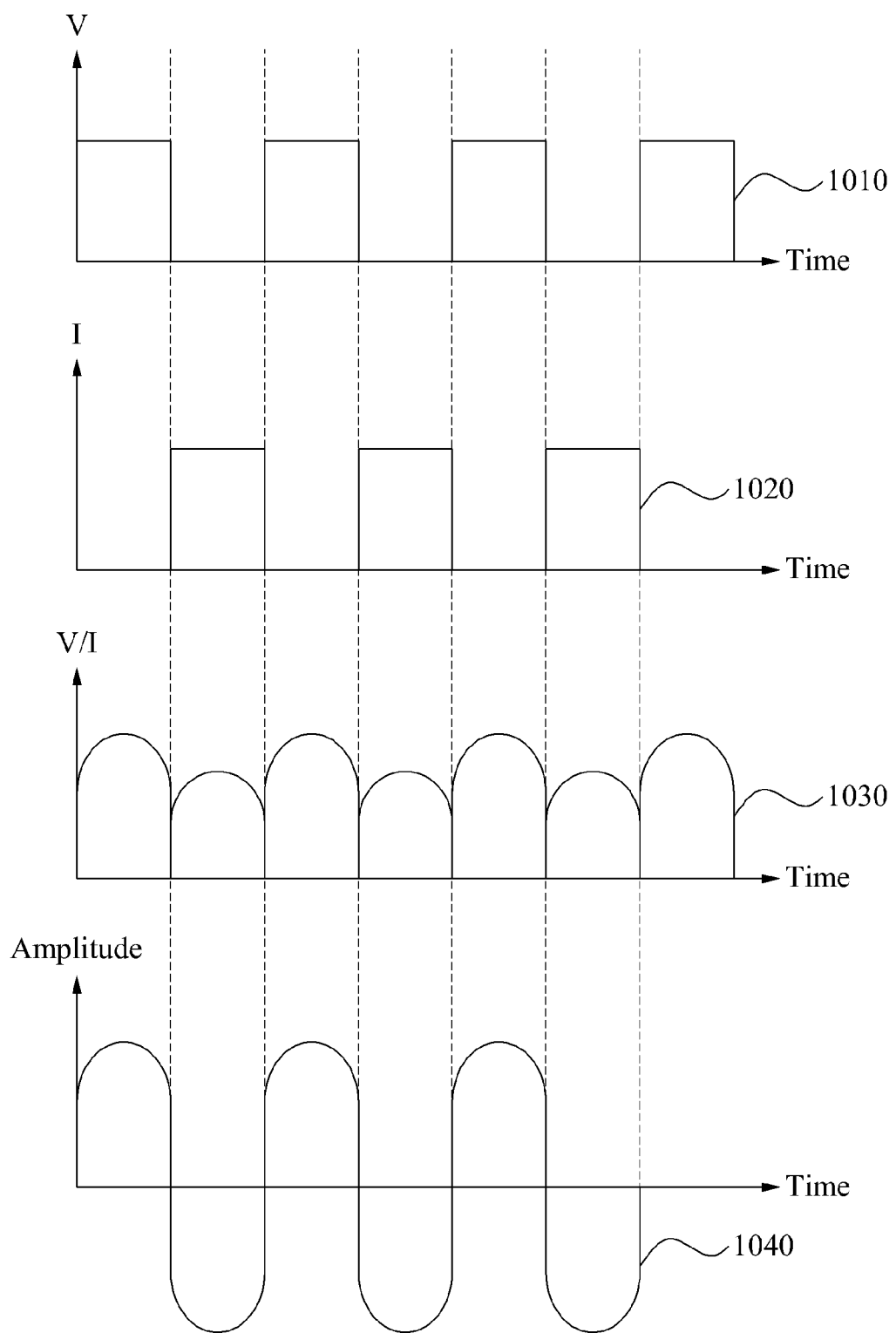
FIG. 10 is a diagram illustrating examples of waveforms of a signal that are output from a switching device and a resonance power generator in the resonance power generation apparatus of FIG. 5.

FIG. 10 illustrates examples of waveforms of a signal that are output from the switching device 331 and the resonance power generator 340 of FIG. 5.

Referring to FIG. 10, reference numeral 1010 indicates a voltage waveform, and reference numeral 1020 indicates a current waveform. Additionally, reference numeral 1030 indicates a waveform obtained by combining the current waveform and the voltage waveform. Furthermore, reference numeral 1040 indicates a waveform of an AC resonance power generated by the resonance power generator 340.

For example, a source resonator and/or a target resonator may be configured as, for example, a helix coil structured resonator, a spiral coil structured resonator, a meta-structured resonator, and the like.

All materials have a unique magnetic permeability (Mµ) and a unique permittivity epsilon (□). The magnetic permeability indicates a ratio between a magnetic flux density that occurs with respect to a predetermined magnetic field in a corresponding material and a magnetic flux density that occurs with respect to the predetermined magnetic field in a vacuum state. The magnetic permeability and the permittivity may determine a propagation constant of a corresponding material at a predetermined frequency or at a predetermined wavelength.

An electromagnetic characteristic of the corresponding material may be determined based on the magnetic permeability and the permittivity. For example, a material having a magnetic permeability or a permittivity absent in nature and that is artificially designed may be referred to as a metamaterial. The metamaterial may be easily disposed in a resonance state even in a relatively large wavelength area or a relatively low frequency area. For example, even though a material size rarely varies, the metamaterial may be easily disposed in the resonance state.

Figure 11:
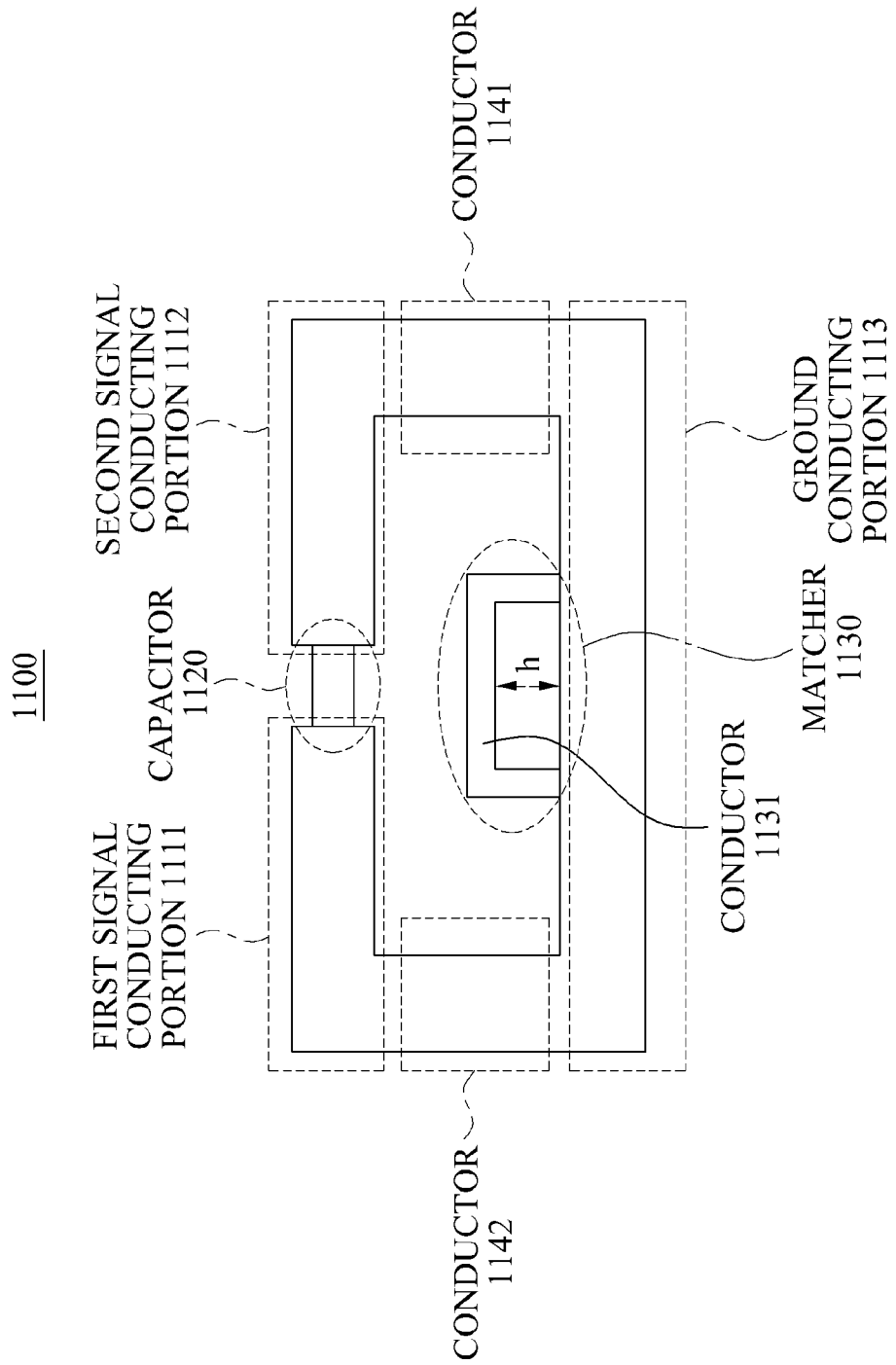
FIG. 11 is a diagram illustrating a two-dimensional (2D) example of a resonator.

FIG. 11 illustrates a two-dimensional (2D) example of a resonator.

Referring to FIG. 11, resonator 1100 includes a transmission line, a capacitor 1120, a matcher 1130, and conductors 1141 and 1142. In this example, the transmission line includes a first signal conducting portion 1111, a second signal conducting portion 1112, and a ground conducting portion 1113.

The capacitor 1120 may be inserted in series between the first signal conducting portion 1111 and the second signal conducting portion 1112, whereby an electric field may be confined within the capacitor 1120. For example, the transmission line may include at least one conductor in an upper portion of the transmission line, and may also include at least one conductor in a lower portion of the transmission line. Current may flow through the at least one conductor disposed in the upper portion of the transmission line and the at least one conductor disposed in the lower portion of the transmission may be electrically grounded. In this example, a conductor disposed in an upper portion of the transmission line is referred to as the first signal conducting portion 1111 and the second signal conducting portion 1112. A conductor disposed in the lower portion of the transmission line is referred to as the ground conducting portion 1113.

As illustrated in FIG. 11, the transmission line includes the first signal conducting portion 1111 and the second signal conducting portion 1112 in the upper portion of the transmission line, and includes the ground conducting portion 1113 in the lower portion of the transmission line. The first signal conducting portion 1111 and the second signal conducting portion 1112 may be disposed such that they face the ground conducting portion 1113. Current may flow through the first signal conducting portion 1111 and the second signal conducting portion 1112.

One end of the first signal conducting portion 1111 may be shorted to the conductor 1142, and another end of the first signal conducting portion 1111 may be connected to the capacitor 1120. One end of the second signal conducting portion 1112 may be grounded to the conductor 1141, and another end of the second signal conducting portion 1112 may be connected to the capacitor 1120. Accordingly, the first signal conducting portion 1111, the second signal conducting portion 1112, the ground conducting portion 1113, and the conductors 1141 and 1142 may be connected to each other, such that the resonator 1100 has an electrically closed-loop structure. The term "loop structure" may include a polygonal structure, for example, a circular structure, a rectangular structure, and the like. "Having a loop structure" indicates a circuit that is electrically closed.

The capacitor 1120 may be inserted into an intermediate portion of the transmission line. For example, the capacitor 1120 may be inserted into a space between the first signal conducting portion 1111 and the second signal conducting portion 1112. The capacitor 1120 may have various shapes, for example, a shape of a lumped element, a distributed element, and the like. For example, a distributed capacitor that has the shape of the distributed element may include zigzagged conductor lines and a dielectric material that has a relatively high permittivity between the zigzagged conductor lines.

In an example in which the capacitor 1120 is inserted into the transmission line, the resonator 1100 may have a property of a metamaterial. The metamaterial indicates a material that has a predetermined electrical property that is absent in nature, and thus may have an artificially designed structure. An electromagnetic characteristic of materials existing in nature may have a unique magnetic permeability or a unique permittivity.

Most materials may have a positive magnetic permeability or a positive permittivity. In the case of most materials, a right hand rule may be applied to an electric field, a magnetic field, and a pointing vector, and thus the corresponding materials may be referred to as right handed materials (RHMs). However, the metamaterial has a magnetic permeability or a permittivity that is absent in nature, and thus, may be classified into, for example, an epsilon negative (ENG) material, a mu negative (MNG) material, a double negative (DNG) material, a negative refractive index (NRI) material, a left-handed (LH)

material, and the like, based on a sign of the corresponding permittivity or magnetic permeability.

In an example in which a capacitance of the capacitor 1120 inserted as the lumped element is appropriately determined, the resonator 1100 may have the characteristic of the metamaterial. Because the resonator 1100 may have a negative magnetic permeability by appropriately adjusting the capacitance of the capacitor 1120, the resonator 1100 may also be referred to as an MNG resonator. Various criteria may be applied to determine the capacitance of the capacitor 1120. For example, the various criteria may include a criterion to enable the resonator 1100 to have the characteristic of the metamaterial, a criterion to enable the resonator 1100 to have a negative magnetic permeability in a target frequency, a criterion to enable the resonator 1100 to have a zeroth order resonance characteristic in the target frequency, and the like. For example, the capacitance of the capacitor 1120 may be determined based on at least one criterion.

The resonator 1100, also referred to as the MNG resonator 1100, may have a zeroth order resonance characteristic that has, as a resonance frequency, a frequency when a propagation constant is "0". For example, a zeroth order resonance characteristic may be frequency transmitted through a line or a medium that has a propagation constant of zero. Because the resonator 1100 may have the zeroth order resonance characteristic, the resonance frequency may be independent with respect to a physical size of the MNG resonator 1100. By appropriately designing the capacitor 1120, the MNG resonator 1100 may sufficiently change the resonance frequency. Accordingly, the physical size of the MNG resonator 1100 may not need to be changed in order to change the resonance frequency.

In a near field, the electric field may be concentrated on the capacitor 1120 inserted into the transmission line. Accordingly, due to the capacitor 1120, the magnetic field may become dominant in the near field. The MNG resonator 1100 may have a relatively high Q-factor using the capacitor 1120 of the lumped element and thus, it is possible to enhance an efficiency of power transmission. In this example, the Q-factor indicates a level of an ohmic loss or a ratio of a reactance with respect to a resistance in the wireless power transmission. It should be understood that the efficiency of the wireless power transmission may increase according to an increase in the Q-factor.

The MNG resonator 1100 may include the matcher 1130 to be used in impedance matching. The matcher 1130 may adjust a strength of a magnetic field of the MNG resonator 1100. An impedance of the MNG resonator 1100 may be determined by the matcher 1130. For example, current may flow into and/or out of the MNG resonator 1100 via a connector. The connector may be connected to the ground conducting portion 1113 or the matcher 1130. Power may be transferred through coupling without using a physical connection between the connector and the ground conducting portion 1113 or the matcher 1130.

For example, as illustrated in FIG. 11, the matcher 1130 may be positioned within the loop formed by the loop structure of the resonator 1100. The matcher 1130 may adjust the impedance of the resonator 1100 by changing the physical shape of the matcher 1130. For example, the matcher 1130 may include the conductor 1131 to be used in the impedance matching in a location that is separated from the ground conducting portion 1113 by a distance h. Accordingly, the impedance of the resonator 1100 may be changed by adjusting the distance h.

Although not illustrated in FIG. 11, a controller may be provided to control the matcher 1130. In this example, the matcher 1130 may change the physical shape of the matcher 1130 based on a control signal generated by the controller. For example, the distance h between the conductor 1131 of the matcher 1130 and the ground conducting portion 1113 may be increased or decreased based on the control signal. Accordingly, the physical shape of the matcher 1130 may be changed and the impedance of the resonator 1100 may be adjusted. The controller may generate the control signal based on various factors, which is further described later.

As illustrated in FIG. 11, the matcher 1130 may be configured as a passive element such as the conductor 1131. As another example, the matcher 1130 may be configured as an active element such as a diode, a transistor, and the like. In an example in which the active element is included in the matcher 1130, the active element may be driven based on the control signal generated by the controller, and the impedance of the resonator 1100 may be adjusted based on the control signal. For example, a diode that is a type of active element may be included in the matcher 1130. The impedance of the resonator 1100 may be adjusted depending on whether the diode is in an ON state or in an OFF state.

Although not illustrated in FIG. 11, a magnetic core may be included in the MNG resonator 1100. The magnetic core may increase power transmission distance.

Figure 12:
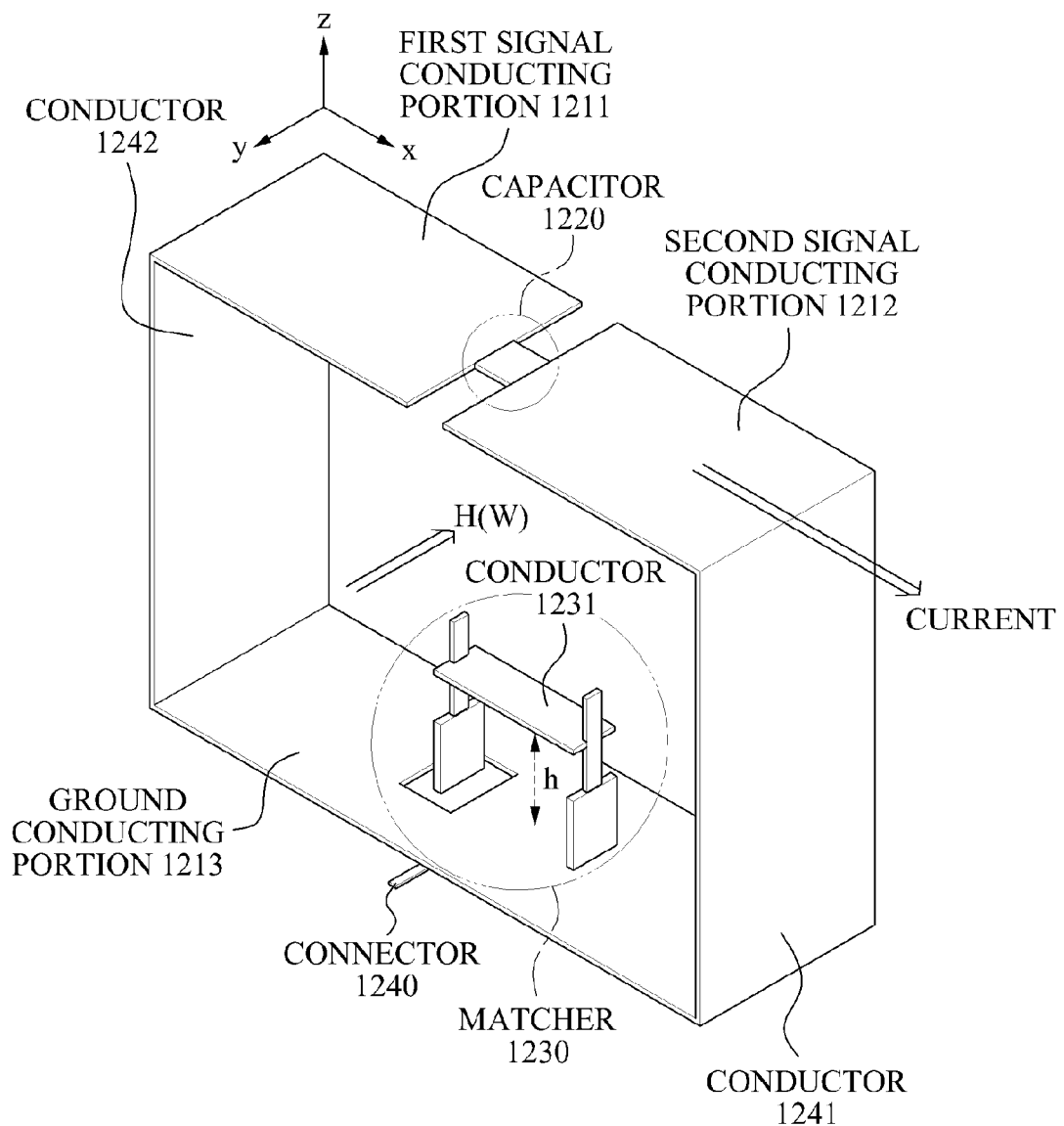
FIG. 12 is a diagram illustrating a three-dimensional (3D) example of a resonator.

FIG. 12 illustrates a three-dimensional (3D) example of a resonator.

Referring to FIG. 12, resonator 1200 includes a transmission line and a capacitor 1220. In this example, the transmission line includes a first signal conducting portion 1211, a second signal conducting portion 1212, and a ground conducting portion 1213. The capacitor 1220 may be inserted in series between the first signal conducting portion 1211 and the second signal conducting portion 1212 of the transmission line, and an electric field may be confined within the capacitor 1220.

In this example, the transmission line includes the first signal conducting portion 1211 and the second signal conducting portion 1212 in an upper portion of the resonator 1200, and includes the ground conducting portion 1213 in a lower portion of the resonator 1200. The first signal conducting portion 1211 and the second signal conducting portion 1212 may be disposed such that they face the ground conducting portion 1213. Current may flow in an x direction through the first signal conducting portion 1211 and the second signal conducting portion 1212. As a result of the current, a magnetic field H(W) may be formed in a −y direction. Alternatively, unlike the diagram of FIG. 12, the magnetic field H(W) may be formed in a +y direction.

One end of the first signal conducting portion 1211 may be shorted to the conductor 1242, and another end of the first signal conducting portion 1211 may be connected to the capacitor 1220. One end of the second signal conducting portion 1212 may be grounded to the conductor 1241, and another end of the second signal conducting portion 1212 may be connected to the capacitor 1220. Accordingly, the first signal conducting portion 1211, the second signal conducting portion 1212, the ground conducting portion 1213, and the conductors 1241 and 1242 may be connected to each other, such that the resonator 1200 has an electrically closed-loop structure.

As illustrated in FIG. 12, the capacitor 1220 may be inserted between the first signal conducting portion 1211 and the second signal conducting portion 1212. For example, the capacitor 1220 may be inserted into a space between the first signal conducting portion 1211 and the second signal conducting portion 1212. The capacitor 1220 may have various shapes, for example, a shape of a lumped element, a distributed element, and the like. For example, a distributed capacitor that has the shape of the distributed element may include zigzagged conductor lines and a dielectric material that has a relatively high permittivity between the zigzagged conductor lines.

As the capacitor 1220 is inserted into the transmission line, the resonator 1200 may have a property of a metamaterial.

In a case in which a capacitance of the capacitor inserted as the lumped element is appropriately determined, the resonator 1200 may have the characteristic of the metamaterial. Because the resonator 1200 may have a negative magnetic permeability by adjusting the capacitance of the capacitor 1220, the resonator 1200 may also be referred to as an MNG resonator. Various criteria may be applied to determine the capacitance of the capacitor 1220. For example, the various criteria may include a criterion to enable the resonator 1200 to have the characteristic of the metamaterial, a criterion to enable the resonator 1200 to have a negative magnetic permeability in a target frequency, a criterion to enable the resonator 1200 to have a zeroth order resonance characteristic in the target frequency, and the like. For example, the capacitance of the capacitor 1220 may be determined based on at least one criterion.

The resonator 1200, also referred to as the MNG resonator 1200, may have a zeroth order resonance characteristic that has, as a resonance frequency, a frequency when a propagation constant is "0". Because the resonator 1200 may have the zeroth order resonance characteristic, the resonance frequency may be independent with respect to a physical size of the MNG resonator 1200. By appropriately designing the capacitor 1220, the MNG resonator 1200 may sufficiently change the resonance frequency. Accordingly, the physical size of the MNG resonator 1200 may not be changed.

Referring to the MNG, resonator 1200 of FIG. 12, in a near field, the electric field may be concentrated on the capacitor 1220 inserted into the transmission line. Accordingly, due to the capacitor 1220, the magnetic field may become dominant in the near field. Because the MNG resonator 1200 having the zeroth-order resonance characteristic may have characteristics similar to a magnetic dipole, the magnetic field may become dominant in the near field. A relatively small amount of the electric field formed due to the insertion of the capacitor 1220 may be concentrated on the capacitor 1220 and thus, the magnetic field may become further dominant. The MNG resonator 1200 may have a relatively high Q-factor using the capacitor 1220 as the lumped element, and thus it is possible to enhance a power transmission efficiency.

Also, the MNG resonator 1200 may include the matcher 1230 to be used in impedance matching. The matcher 1230 may adjust the strength of magnetic field of the MNG resonator 1200. An impedance of the MNG resonator 1200 may be determined by the matcher 1230. For example, current may flow into and/or out of the MNG resonator 1200 via a connector 1240. The connector 1240 may be connected to the ground conducting portion 1213 or the matcher 1230.

For example, as illustrated in FIG. 12, the matcher 1230 may be positioned within the loop formed by the loop structure of the resonator 1200. The matcher 1230 may adjust the impedance of the resonator 1200 by changing the physical shape of the matcher 1230. For example, the matcher 1230 may include the conductor 1231 to be used in the impedance matching in a location that is separated from the ground conducting portion 1213 by a distance h. Accordingly, the impedance of the resonator 1200 may be changed by adjusting the distance h.

Although not illustrated in FIG. 12, a controller may be provided to control the matcher 1230. In this example, the matcher 1230 may change the physical shape of the matcher 1230 based on a control signal generated by the controller. For example, the distance h between the conductor 1231 of the matcher 1230 and the ground conducting portion 1213 may be increased or decreased based on the control signal. Accordingly, the physical shape of the matcher 1230 may be changed and the impedance of the resonator 1200 may be adjusted.

The distance h between the conductor 1231 of the matcher 1230 and the ground conducting portion 1213 may be adjusted using a variety of schemes. For example, a plurality of conductors may be included in the matcher 1230 and the distance h may be adjusted by adaptively activating one of the conductors. As another example, the distance h may be adjusted by adjusting the physical location of the conductor 1231 up and down. The distance h may be controlled based on the control signal of the controller. For example, the controller may generate the control signal using various factors. An example of such a controller generating the control signal is further described later.

As illustrated in FIG. 12, the matcher 1230 may be configured as a passive element such as the conductor 1231. As another example, the matcher 1230 may be configured as an active element such as a diode, a transistor, and the like. In an example in which the active element is included in the matcher 1230, the active element may be driven based on the control signal generated by the controller, and the impedance of the resonator 1200 may be adjusted based on the control signal. For example, a diode that is an active element may be included in the matcher 1230. The impedance of the resonator 1200 may be adjusted depending on whether the diode is in an ON state or in an OFF state.

Although not illustrated in FIG. 12, a magnetic core may be included in the resonator 1200 configured as the MNG resonator. The magnetic core may increase a power transmission distance.

Figure 13:
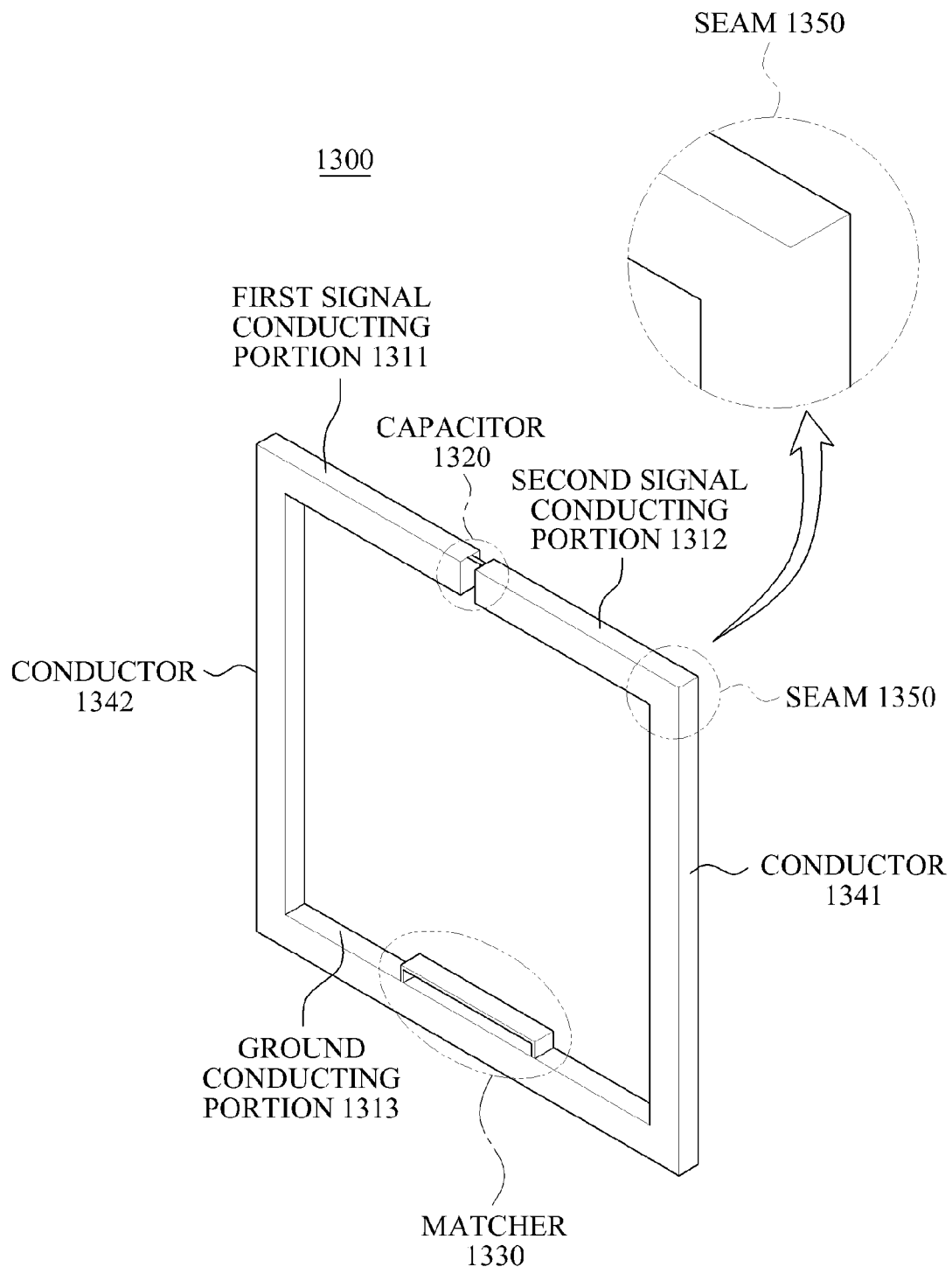
FIG. 13 is a diagram illustrating an example of a resonator for wireless power transmission configured as a bulky type.

FIG. 13 illustrates an example of a resonator for wireless power transmission configured as a bulky type.

Referring to FIG. 13, a first signal conducting portion 1311 and a conductor 1342 may be integrally formed, rather than being separately manufactured, and may be connected to each other. Similarly, a second signal conducting portion 1312 and a conductor 1341 may also be integrally manufactured.

In an example in which the second signal conducting portion 1312 and the conductor 1341 are separately manufactured and connected to each other, a loss of conduction may occur due to a seam 1350. The second signal conducting portion 1312 and the conductor 1341 may be connected to each other without using a separate seam such that they are seamlessly connected to each other. Accordingly, it is possible to decrease a conductor loss caused by the seam 1350. Accordingly, the second signal conducting portion 1312 and a ground conducting portion 813 may be seamlessly and integrally manufactured. Similarly, the first signal conducting portion 1311 and the ground conducting portion 813 may be seamlessly and integrally manufactured.

Referring to FIG. 13, a type of a seamless connection connecting at least two partitions into an integrated form is referred to as a bulky type.

Figure 14:
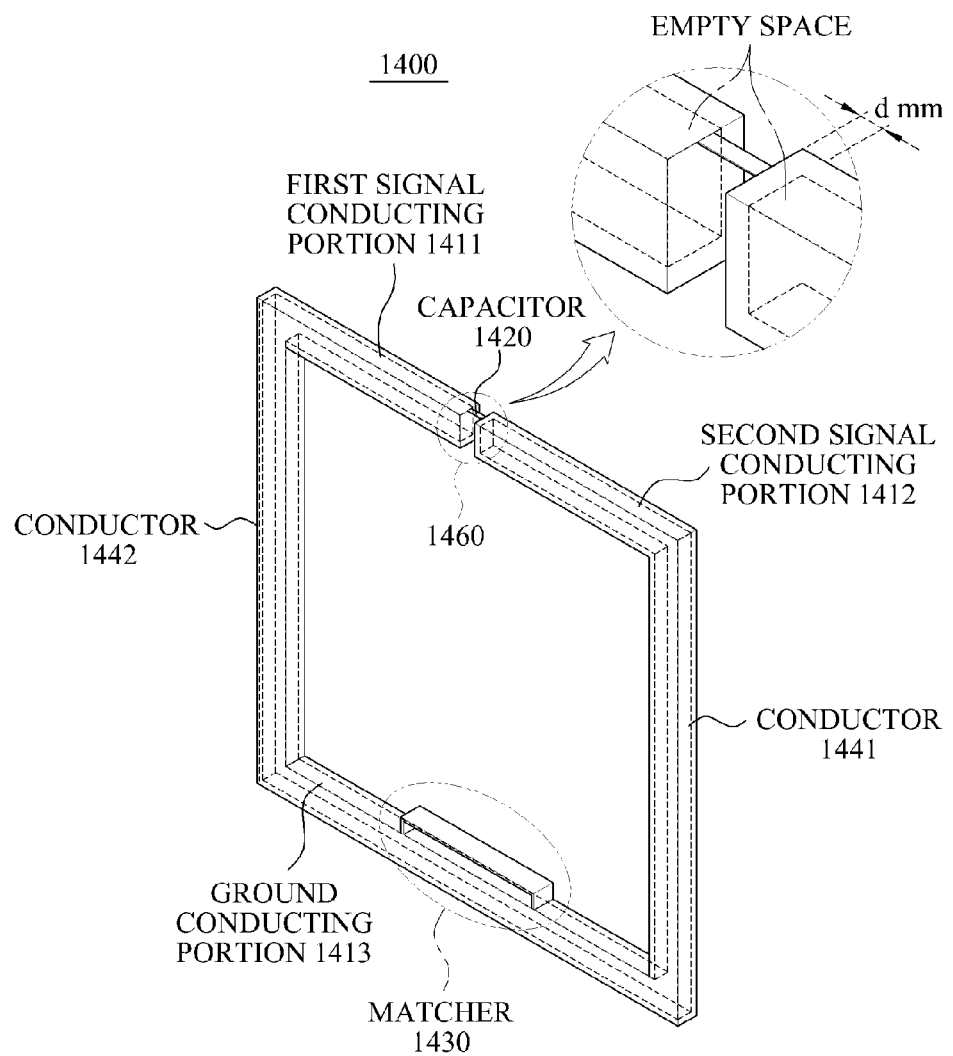
FIG. 14 is a diagram illustrating an example of a resonator for wireless power transmission configured as a hollow type.

FIG. 14 illustrates an example of a resonator for wireless power transmission, configured as a hollow type.

Referring to FIG. 14, each of a first signal conducting portion 1411, a second signal conducting portion 1412, a ground conducting portion 1413, and conductors 1441 and 1442 of the resonator 1400 configured as the hollow type includes an empty space inside.

In a predetermined resonance frequency, an active current may be modeled to flow in only a portion of the first signal conducting portion 1411 instead of the entire first signal conducting portion 1411, only a portion of the second signal conducting portion 1412 instead of the entire second signal conducting portion 1412, only a portion of the ground conducting portion 1413 instead of the entire ground conducting portion 1413, and only portions of the conductors 1441 and 1442 instead of the entire conductors 1441 and 1442. In an example in which a depth of the first signal conducting portion 1411, the second signal conducting portion 1412, the ground conducting portion 1413, and the conductors 1441 and 1442 are significantly deeper than a corresponding skin depth in the predetermined resonance frequency, such a structure may be ineffective. The significantly deeper depth may increase a weight or manufacturing costs of the resonator 1400.

Accordingly, in the predetermined resonance frequency, the depth of each of the first signal conducting portion 1411, the second signal conducting portion 1412, the ground conducting portion 1413, and the conductors 1441 and 1442 may be appropriately determined based on the corresponding skin depth of each of the first signal conducting portion 1411, the second signal conducting portion 1412, the ground conducting portion 1413, and the conductors 1441 and 1442. In an example in which each of the first signal conducting portion 1411, the second signal conducting portion 1412, the ground conducting portion 1413, and the conductors 1441 and 1442 have an appropriate depth that is deeper than a corresponding skin depth, the resonator 1400 may be manufactured to be lighter, and manufacturing costs of the resonator 1400 may also decrease.

For example, as illustrated in FIG. 14, the depth of the second signal conducting portion 1412 may be determined as "d" mm and d may be determined according to $$d = \frac{1}{\sqrt{\pi f \mu \sigma}}.$$

In this example, f denotes a frequency, µ denotes a magnetic permeability, and σ denotes a conductor constant.

In an example in which the first signal conducting portion 1411, the second signal conducting portion 1412, the ground conducting portion 1413, and the conductors 1441 and 1442 are made of a copper and have a conductivity of $5.8 \times 10^7$ siemens per meter ($S \cdot m^{-1}$), the skin depth may be about 0.6 mm with respect to 10 kHz of the resonance frequency, and the skin depth may be about 0.006 mm with respect to 100 MHz of the resonance frequency.

Figure 15:
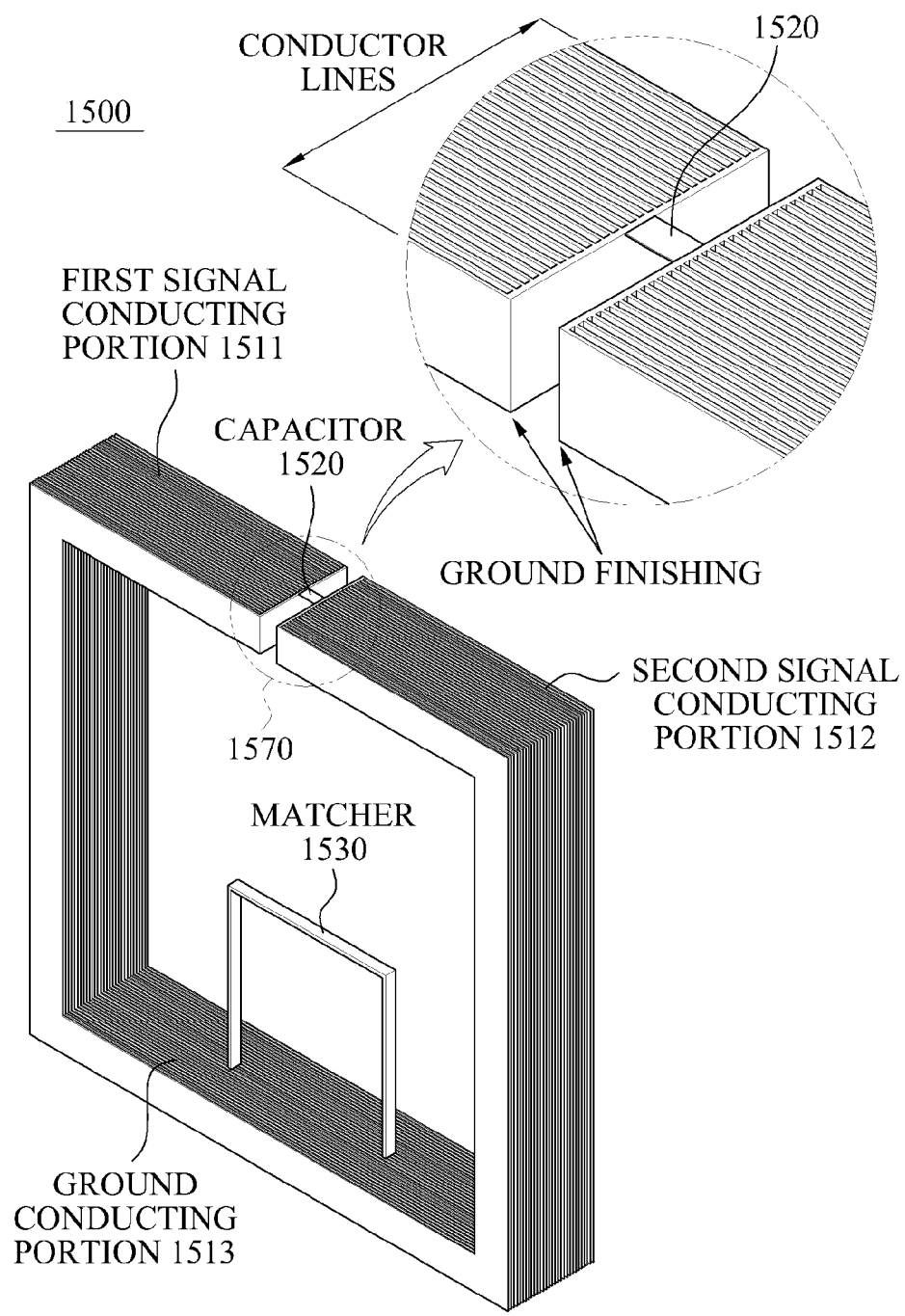
FIG. 15 is a diagram illustrating an example of a resonator for wireless power transmission using a parallel-sheet configuration.

FIG. 15 illustrates an example of a resonator for a wireless power transmission using a parallel-sheet configuration.

Referring to FIG. 15, the parallel-sheet configuration may be applicable to each of a first signal conducting portion 1511 and a second signal conducting portion 1512 included in the resonator 1000.

For example, the first signal conducting portion 1511 and the second signal conducting portion 1512 may not be a perfect conductor, and thus may have a resistance. Due to the resistance, an ohmic loss may occur. The ohmic loss may decrease a Q-factor and may also decrease a coupling effect.

By applying the parallel-sheet configuration to each of the first signal conducting portion 1511 and the second signal conducting portion 1512, it is possible to decrease the ohmic loss, and to increase the Q-factor and the coupling effect. For example, referring to a portion 1570 indicated by a circle in FIG. 15, in an example in which the parallel-sheet configuration is applied, each of the first signal conducting portion 1511 and the second signal conducting portion 1512 may include a plurality of conductor lines. For example, the plurality of conductor lines may be disposed in parallel, and may be shorted at an end portion of each of the first signal conducting portion 1511 and the second signal conducting portion 1512.

As described above, in an example in which the parallel-sheet configuration is applied to each of the first signal conducting portion 1511 and the second signal conducting portion 1512, the plurality of conductor lines may be disposed in parallel. Accordingly, a sum of resistances having the conductor lines may decrease. As a result, the resistance loss may decrease, and the Q-factor and the coupling effect may increase.

Figure 16:
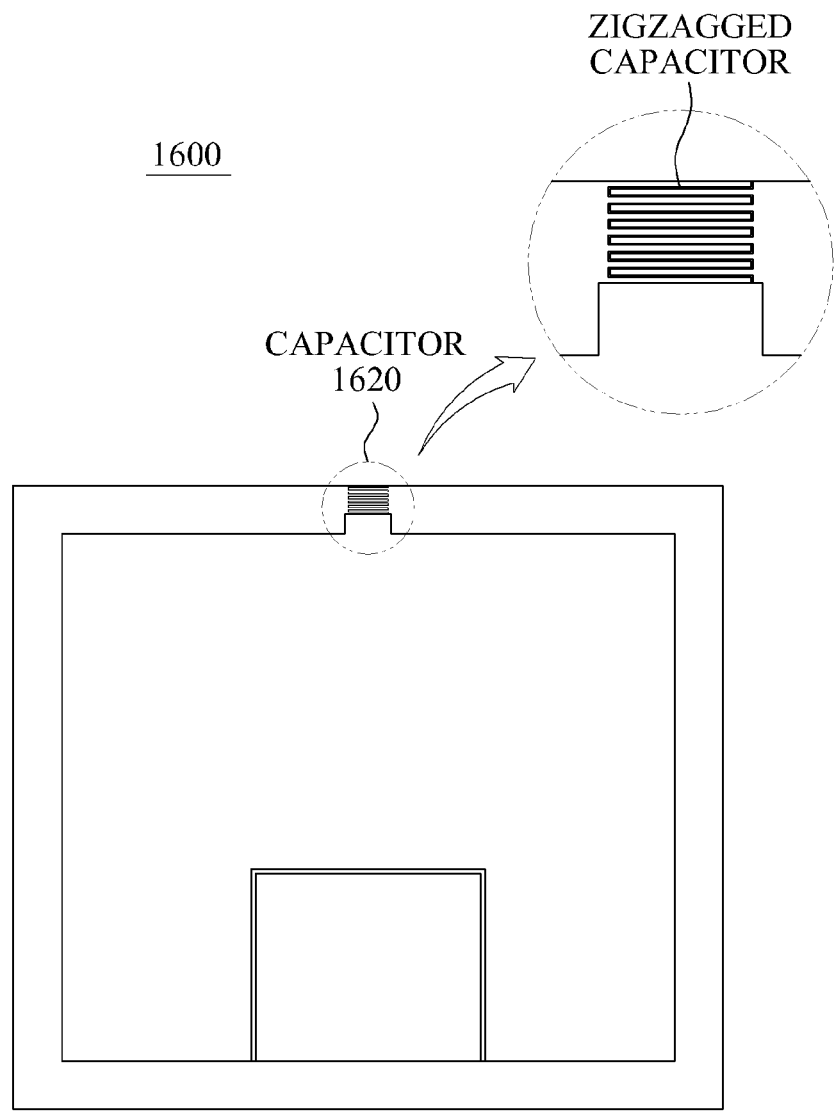
FIG. 16 is a diagram illustrating an example of a resonator for wireless power transmission including a distributed capacitor.

FIG. 16 illustrates an example of a resonator 1600 for a wireless power transmission including a distributed capacitor.

Referring to FIG. 16, a capacitor 1620 included in the resonator 1600 for the wireless power transmission may be a distributed capacitor. A capacitor as a lumped element may have a relatively high equivalent series resistance (ESR). A variety of schemes have been proposed to decrease the ESR contained in the capacitor of the lumped element. For example, by using the capacitor 1620 as a distributed element, it is possible to decrease the ESR. A loss caused by the ESR may decrease a Q-factor and a coupling effect.

As illustrated in FIG. 16, the capacitor 1620 as the distributed element may have a zigzagged structure. For example, the capacitor 1620 as the distributed element may be configured as a conductive line and a conductor having the zigzagged structure.

As illustrated in FIG. 16, by employing the capacitor 1620 as the distributed element, it is possible to decrease the loss that occurs due to the ESR. In addition, by disposing a plurality of capacitors as lumped elements, it is possible to decrease the loss that occurs due to the ESR. Because a resistance of each of the capacitors as the lumped elements decreases through a parallel connection, active resistances of parallel-connected capacitors as the lumped elements may also decrease, and the loss that occurs due to the ESR may decrease. For example, by employing ten capacitors of 1 pF instead of using a single capacitor of 10 pF, it is possible to decrease the loss occurring due to the ESR.

Figure 17A:
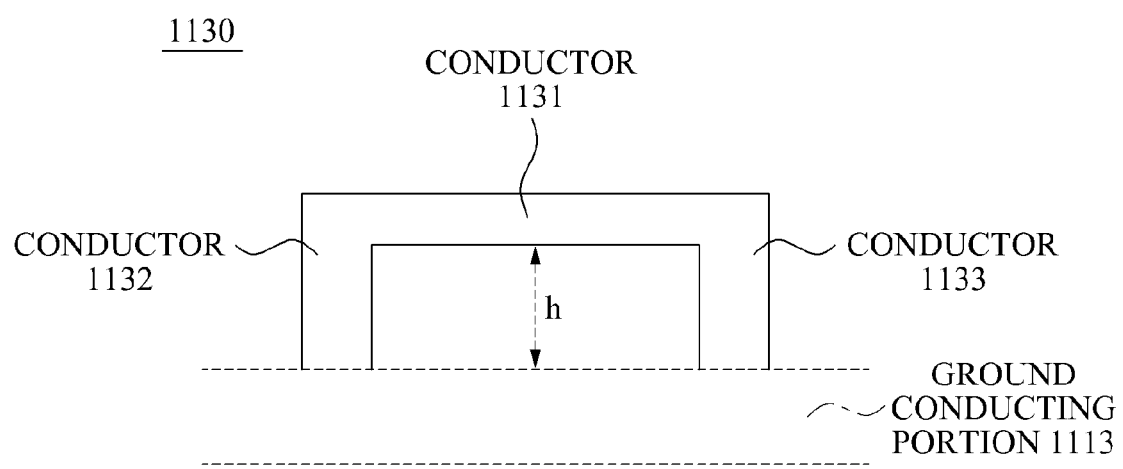
FIG. 17A is a diagram illustrating an example of the matcher used in the resonator of FIG. 12.
Figure 17B:
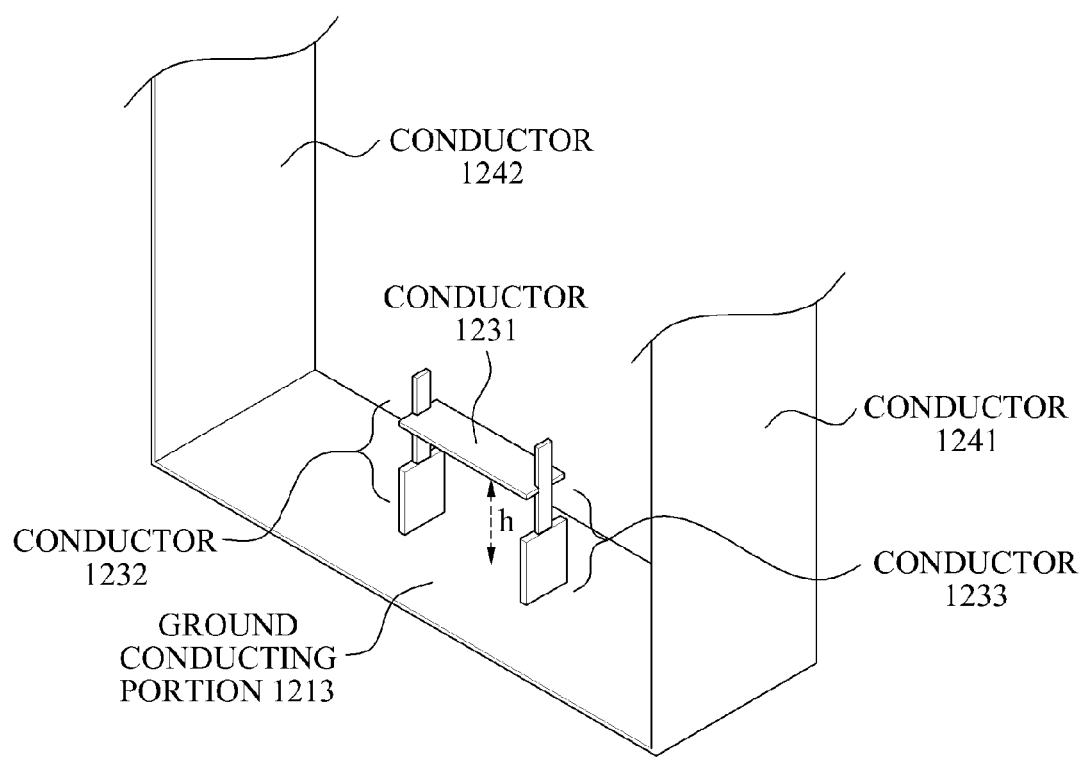
FIG. 17B is a diagram illustrating an example of the matcher used in the resonator of FIG. 13.

FIG. 17A illustrates an example of the matcher 1130 used in the resonator 1100 illustrated in FIG. 11, and FIG. 17B illustrates an example of the matcher 1230 used in the resonator 1200 illustrated in FIG. 12.

FIG. 17A illustrates a portion of the resonator of FIG. 11 including the matcher 1130, and FIG. 17B illustrates a portion of the resonator of FIG. 12 including the matcher 1230.

Referring to FIG. 17A, the matcher 1130 includes a conductor 1131, a conductor 1132, and a conductor 1133. The conductors 1132 and 1133 may be connected to the ground conducting portion 1113 and the conductor 1131. The impedance of the 2D resonator may be determined based on a distance h between the conductor 1131 and the ground conducting portion 1113. For example, the distance h between the conductor 1131 and the ground conducting portion 1113 may be controlled by the controller. The distance h between the conductor 1131 and the ground conducting portion 1113 may be adjusted using a variety of schemes. For example, the variety of schemes may include a scheme of adjusting the distance h by adaptively activating one of the conductors 1131, 1132, and 1133, a scheme of adjusting the physical location of the conductor 1131 up and down, and the like.

Referring to FIG. 17B, the matcher 1230 includes a conductor 1231, a conductor 1232, and a conductor 1233. The conductors 1232 and 1233 may be connected to the ground conducting portion 1213 and the conductor 1231. The impedance of the 3D resonator may be determined based on a distance h between the conductor 1231 and the ground conducting portion 1213. For example, the distance h between the conductor 1231 and the ground conducting portion 1213 may be controlled by the controller. Similar to the matcher 1230 illustrated in FIG. 12, in the matcher 1230 the distance h between the conductor 1231 and the ground conducting portion 1213 may be adjusted using a variety of schemes. For example, the variety of schemes may include a scheme of adjusting the distance h by, adaptively activating one of the conductors 1231, 1232, and 1233, a scheme of adjusting the physical location of the conductor 1231 up and down, and the like.

Although not illustrated in FIGS. 17A and 17B, the matcher may include an active element. A scheme of adjusting an impedance of a resonator using the active element may be similar to the examples described above. For example, the impedance of the resonator may be adjusted by changing a path of current flowing through the matcher using the active element.

Figure 18:
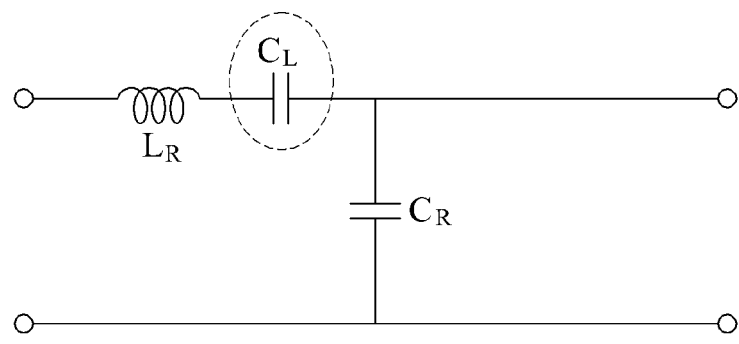
FIG. 18 is a diagram illustrating an example of an equivalent circuit of the resonator of FIG. 11.

FIG. 18 illustrates an example of an equivalent circuit of the resonator 1100 of FIG. 11.

The resonator 1100 used in a wireless power transmission may be modeled to the equivalent circuit of FIG. 18. In the equivalent circuit of FIG. 18, $C_L$ denotes a capacitor that is inserted in a form of a lumped element in the middle of the transmission line of FIG. 11.

In this example, the resonator 1100 may have a zeroth resonance characteristic. For example, when a propagation constant is "0", the resonator 1100 may be assumed to have $\omega_{MZR}$ as a resonance frequency. The resonance frequency $\omega_{MZR}$ may be expressed by Equation 2.

$$\omega_{MZR} = \frac{1}{\sqrt{L_R C_L}} \qquad \text{[Equation 2]}$$

In Equation 2, MZR denotes a Mu zero resonator.

Referring to Equation 2, the resonance frequency $\omega_{MZR}$ of the resonator 1100 may be determined by $$\frac{L_R}{C_L}.$$

A physical size of the resonator 1100 and the resonance frequency $\omega_{MZR}$ may be independent with respect to each other. Because the physical sizes are independent with respect to each other, the physical size of the resonator 1100 may to be sufficiently reduced.

According to various aspects, it is possible to improve efficiency in converting an alternating signal in a band of several tens of hertz (Hz) into an alternating signal in a band of several hundreds of kilohertz (KHz) to several tens of megahertz (MHz).

In response to resonance power being transmitted, it is possible to remove an overlap between a voltage waveform and a current waveform, thereby reducing a power loss caused by a device used in the transmission and reception of power.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules that are recorded, stored, or fixed in one or more computer-readable storage media, in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A resonance power generation apparatus, comprising:
a voltage controller to receive an input of an alternating current (AC) signal of a first frequency band, and to output a direct current (DC) voltage that has a constant level;
a power converter to separate the DC voltage into a voltage waveform and a current waveform by a switching pulse signal of a second frequency band;
a resonance power generator to generate an AC resonance power by combining the voltage waveform and the current waveform, and to remove a harmonic component; and
a controller to apply the switching pulse signal to the power converter.

2. The resonance power generation apparatus of claim 1, wherein the power converter comprises:
a switching device that is switched based on the switching pulse signal; and
a voltage accumulator to accumulate a voltage output via the switching device during a low level of the switching pulse signal.

3. The resonance power generation apparatus of claim 1, wherein the resonance power generator comprises:
a frequency resonating unit to generate an AC signal with a resonance frequency;
a matching transformer to generate an AC resonance power with a sine waveform from an AC signal output from the frequency resonating unit; and
a source resonator to transmit a generated resonance power to a target resonator.

4. The resonance power generation apparatus of claim 1, wherein the switching pulse signal comprises a sine wave signal or a square wave signal.

5. The resonance power generation apparatus of claim 1, wherein the controller drives signal levels of the voltage waveform and the current waveform that are output from the power converter, by adjusting a power level of the switching pulse signal.

6. The resonance power generation apparatus of claim 4, wherein the controller selects a switching pulse signal from among the sine wave signal and the square wave signal, based on a transmission efficiency and a distance to a target resonator, and provides the selected switching pulse signal to the power converter.

7. The resonance power generation apparatus of claim 1, wherein the second frequency band ranges from 500 kilohertz (KHz) to 20 megahertz (MHz).

8. The resonance power generation apparatus of claim 1, wherein the controller controls a duty rate of the switching pulse signal to be 10% to 90%.

9. The resonance power generation apparatus of claim 1, wherein the voltage waveform and the current waveform do not overlap with each other.

10. The resonance power generation apparatus of claim 1, wherein the controller controls the voltage controller such that an output voltage of the switching device in the power converter is less than or equal to a set value.

11. The resonance power generation apparatus of claim 1, wherein the AC signal of the first frequency band is generated by a high-speed switching scheme employing a high-speed switching device or by an oscillation scheme employing an oscillator.

* * * * *